Oct. 17, 1950   J. W. FRAZIER ET AL   2,525,887
PLAIN BEARING

Filed March 21, 1946

INVENTORS
JOHN W. FRAZIER
LEONARD J. KOCH

BY

Frank H. Harmon
ATTORNEY

Patented Oct. 17, 1950

2,525,887

UNITED STATES PATENT OFFICE 2,525,887

PLAIN BEARING

John W. Frazier, Shaker Heights, and Leonard J. Koch, Cleveland, Ohio, assignors to Jack & Heintz Precision Industries, Inc., Cleveland, Ohio, a corporation of Delaware Application March 21, 1946, Serial No. 656,130

2 Claims. (Cl. 308—237)

This invention relates to improvements in antifriction plain bearings and method of manufacturing the same.

One of the primary objects of the invention is to provide upon a rigid metal backing member, such as steel or cast iron, a bearing bonded thereto and consisting of selected metals bonded together and to the backing member in such a manner as to inherently enhance corrosion resistance and relative hardness and wearing characteristics of the bearing and which bearing will be capable of withstanding high bearing loads at high operating speeds over a long period of time.

Another object is to provide an improved method of economically and successfully producing uniform plain bearings of this character.

Figure 1:
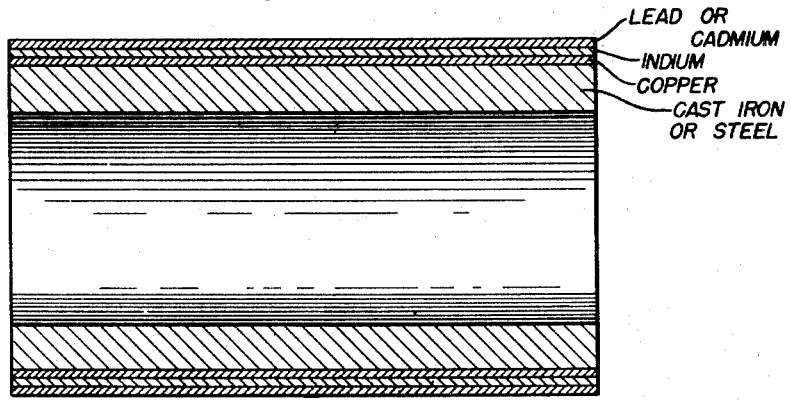
Figure 2:
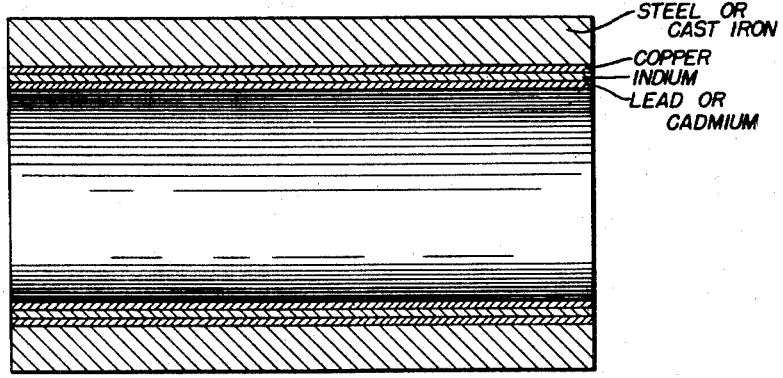

With the foregoing and other objects in view, the invention resides in the combintaion of parts and in the details of construction hereinafter set forth in the following specification and appended claims, certain embodiments thereof being illustrated in the accompanying drawings, in which:

Figure 1 is a view in longitudinal section of a rigid metal backing member showing the bearing bonded to the exterior thereof; and Figure 2 is a similar view showing the bearing bonded to the interior of the backing member.

As shown in the drawings the bearing may be bonded either to the inner or outer surface of the rigid metal backing member which may be of steel, cast iron or the like.

In the preferred embodiment of the present invention the bearing which is bonded to the rigid backing member consists of three metals, namely, copper, indium and either lead or cadmium. Copper, being a relatively hard bearing surface, is bonded directly to the rigid backing member. An intermediate layer of indium is bonded to the copper layer and bonded upon the indium layer is a layer of relatively soft bearing metal such as lead or cadmium.

The preferred method of constructing a bearing of this character contemplates the diffusion of the indium into the initial layer of relatively hard copper bearing metal and into the layer of relatively soft lead or cadmium. Generally, this may be accomplished by heating the composite assembled bearing, after being bonded to the rigid backing member, at a temperature above the approximate melting point of indium (310° F.) but below the melting point of the other two bearing metals, copper and lead or cadmium, for a sufficient length of time to cause the indium to diffuse partially or completely into both the copper and lead or cadmium bearing metals. It is to be understood that instead of resorting to the actual heating process the heat incident to the operation of the engine may in some cases be sufficient to properly diffuse the indium for the desired purpose.

The proportions of indium and lead or cadmium are such that the diffusion temperature and time of application of heat may be controlled to insure either partial or practically complete diffusion of indium into the copper bearing metal and into the lead or cadmium bearing metal. The area of greatest diffusion of indium occurs at the common bond of the two other bearing metals with the indium. This increased hardness and corrosion resistance which the diffused indium imparts to the bearing metals is at a maximum at this point and decreases gradually away from this point.

The initial bearing layer should preferably be of a metal containing at least 50% copper. The intermediate layer of indium should be at least .05% of the initial bearing layer by weight and the soft layer of lead or cadmium should not be more than 10% of the copper bearing layer by weight.

The bearing resulting from this selection and arrangement and bonding of metals onto the rigid backing member and method employed results in a bearing in which the bearing properties of the primary lead or cadmium bearing metal improves as the bearing wears, and in which the copper bearing metal is improved by increased hardness, wearability and corrosion resistance. Under severe loading this insures an improved bearing surface after the soft bearing metal has been worn off.

Moreover, the nature of the method of construction of the bearing lends itself to economic and successful production of uniform bearings of this character.

We claim:

1. An anti-friction bearing comprising a rigid metal backing member, a layer of copper bearing metal bonded to said backing member, a layer of indium bonded to said layer of copper bearing metal and a layer of soft bearing metal bonded to said layer of indium, said indium being diffused by heat into both said copper and soft bearing metals.

2. An anti-friction bearing comprising a rigid metal backing member, a layer of copper bearing metal bonded to said backing member, a layer of indium bonded to said layer of copper bearing metal and a layer of lead bearing metal bonded onto said layer of indium, said indium being diffused by heat into both said copper and lead bearing metals.

JOHN W. FRAZIER.
LEONARD J. KOCH.

REFERENCES CITED

The following references are of record in the file of this patent:

UNITED STATES PATENTS

| Number | Name | Date |
|---|---|---|
| 2,289,572 | Underwood | July 14, 1942 |